United States Patent [19]

Roberts et al.

[11] Patent Number: 5,725,630
[45] Date of Patent: Mar. 10, 1998

[54] DRY GRANULAR FERTILIZER BLEND AND A METHOD OF FERTILIZING PLANTS

[75] Inventors: Johnnie R. Roberts, Memphis; Greg Volgas, Bartlett, both of Tenn.

[73] Assignee: Helena Chemical Co.

[21] Appl. No.: 690,507

[22] Filed: Jul. 31, 1996

[51] Int. Cl.$^6$ ........................................... C05F 11/08
[52] U.S. Cl. ...................... 71/11; 71/51; 71/54; 71/55; 71/59; 71/63; 47/57.6; 47/DIG. 9
[58] Field of Search .................. 71/11, 51, 54, 71/55, 59, 63; 47/DIG. 9, 57.6

[56] References Cited

U.S. PATENT DOCUMENTS

| | | | |
|---|---|---|---|
| 3,854,923 | 12/1974 | Ott | 71/1 |
| 3,909,229 | 9/1975 | Ott | 71/1 X |
| 3,997,319 | 12/1976 | Ott | 71/27 |
| 4,352,688 | 10/1982 | Ott | 71/11 |
| 5,174,806 | 12/1992 | Masuda | 71/29 |

OTHER PUBLICATIONS

*ARA PROFESSIONAL DEALER MANUAL*, Fluid Fertilizers, 1994 Ed., vol. 1, pp. 3–5.
*ARA PROFESSIONAL DEALER MANUAL*, Fluid Fertilizers, 1994 Ed., vol. 1, pp. 16–18.
*ARA PROFESSIONAL DEALER MANUAL*, Fluid Fertilizers, 1994 Ed., vol. 1, pp. 107–118.
*ARA PROFESSIONAL DEALER MANUAL*, Fluid Fertilizers, 1994 Ed., vol. 2, pp. 127–132.
*Crop Protection Reference*, 12th Ed., 1996, pp. 141–144.
*ARA PROFESSIONAL DEALER MANUAL*, Fluid Fertilizers, 1994 Ed., vol. 1, pp. 121–138.

*Primary Examiner*—Ferris Lander
*Attorney, Agent, or Firm*—Connolly & Hutz

[57] ABSTRACT

A liquid fertilizer blends containing alkanoic acids are safely and conveniently applied to young plants or seeds in a dry form. This dry form is generally a granular carrier and facilitates the application of said fertilizers in conjunction with other agrichemicals which are being applied concurrently. Furthermore, this fertilizer has unexpected release characteristics from the granule.

31 Claims, No Drawings

DRY GRANULAR FERTILIZER BLEND AND A METHOD OF FERTILIZING PLANTS

BACKGROUND OF THE INVENTION

1. Field of the Invention

This invention applies to liquid fertilizers and more specifically it relates to a new dry granular fertilizer and a method of fertilizing plants to safely provide alkanoic acids or their salts on a dry carrier placed close to the root zone of young plants or directly on plant seeds. A fertilizer is defined as composition containing nitrogenous, phosphatic and potash fertilizers.

2. Description of Prior Art

ARA Professional Dealer Manual, 1994 edition, Volume 1, which is incorporated by reference herein, (in particular Chapters 1, 2 and 5) disclose the use of fluid fertilizers of as an important source of nutrient for many crops. Fluid fertilizers embrace a number of concepts which illustrate growing selection in materials in production agriculture. Some of the more obvious characteristics of fluid fertilizers are:

1. even application,
2. ease of handling,
3. cold blending options,
4. uniformity of fertilizers with in grades,
5. available options to add secondary, micronutrients and pesticides, and
6. versatility of placement application.

One of the basic raw materials for nutrient fluid fertilizers is anhydrous ammonia, as discussed in Chapter 5 of the ARA Professional Dealer Manual.

ARA Professional Dealer Manual, Volume 2, 1994 Edition, Chapter 7, which is incorporated by reference herein, describes the liquid fertilizers use in furrow or banding application to avoid burning of the crop. Surface banding is the application of fertilizer in continuous strips on the soil surface. This method is accomplished by dribbling liquid at low pressure and through several openings spaced across the swath.

This is sometimes referred to as "dribble application". It is often used to apply nutrients to the soil between the crop rows and to pastures. Surface banding is sometimes done before and sometimes after crop emergence. The later may be referred as sidedressing. However, sidedressing also includes the technique of injecting fluid fertilizers beneath the soil surface between the crop rows.

Another type of band application is root zone or deep banding, which is the application of fluid fertilizers at least 6 inches below the soil surface. The bands may, or may not lie below the seed. It has been known to use agricultural chemicals in furrow applications. COUNTER® 15G is a systemic insecticide, nematicide that can be used in such application.

U.S. Pat. Nos. 3,854,923; 3,909,229 and 3,997,319 all issued to Ott, relate to the use of liquid fertilizers. More particular, they relate the aqueous ammoniacal ionic solutions of zinc alkanolates (U.S. Pat. No. 3,854,923) and zinc carboxylates (U.S. Pat. No. 3,909,229) and a method of fertilizing agricultural soils to provide zinc and nitrogen plant nutrients to plants growing in the soil (U.S. Pat. No. 3,997,319). The Ott patents discuss the use of zinc salts of unsubstituted alkanoic acids, having the formula R COOH, where R is hydrogen or alkyl, preferable $C_{1-5}$ alkyl and most preferably $C_1$ alkyl. All three Ott patents describe that the liquid fertilizer is applied in an aqueous form, not a dry form and necessarily includes the addition of zinc.

Alkanoic acids and their salts have typically been formulated with excess ammonia added to enhance compatibility with other liquid fertilizers. These formulations have exhibited corrosion to many metals. Furthermore, the excess ammonia can degrade many pesticides.

Alkanoic acid formulations have been used to enhance nutrient uptake (see Ott U.S. Pat. No. 3,997,319). A key indication of this enhanced nutrient uptake is a better developed root mass. Best results are obtained by applying alkanoic acids and their salts early in the development of the plant and close to the root zone. Since these liquid pesticides are often not applied in this manner, application of alkanoic acids and their salts is complicated and sometimes requires an additional trip across the field for the grower. This is time-consuming and not generally economical.

U.S. Pat. No. 5,174,806 invention relates to a neutral granular fertilizer comprising a neutral fertilizing composition containing nitrogenous, phosphatic and potash fertilizers and an organic acid and 10–20 parts by weight of a plaster per 100 parts of the fertilizing composition. The plaster is used to encapsulate the sulfate anions. The problem with this invention is that the plaster prevents the fertilizer from being released immediately.

There are potentially compatibility problems associated with the application of fertilizers and other agricultural chemicals as described in Compatibility of Fluid Fertilizer Materials Chapter 6, Volume 1, 1994 Edition, pages 121–138, which is incorporated by reference herein.

A problem with the use of liquid fertilizers in an aqueous form is that if the liquid comes in contact with the seed it can kill the seed or hamper the germination and development of the seed. There is a need to find a new fertilizer that avoids these problems. In addition there is a need to find a new process that can be used safely and is easy to apply.

SUMMARY OF THE INVENTION

This is invention relates to a new dry fertilizer blend and a method of fertilizing a plant comprising applying a dry granular fertilizer comprising alkanoic acid or a salt thereof on a dry carrier into the ground in the vicinity of the plant's roots.

The invention also relates to a dry fertilizer comprising a liquid fertilizer added onto a dry carrier with the proviso that said dry carrier is not a fertilizer composition containing nitrogenous, phosphatic and potash fertilizers. The invention further relates to a new dry fertilizer containing alkanoic acids or salts thereof. The alkanoic acids are preferably $C_1$ to about $C_6$ alkanoic acids.

The invention also relates to a method to mix a seed with the fertilizer comprising mixing the seed with dry fertilizer comprising a liquid fertilizer added onto a dry carrier with the proviso that said dry carrier is not a fertilizer composition containing nitrogenous, phosphatic and potash fertilizers.

The invention also relates to a method of planting seed in the ground comprising mixing at the same time a dry fertilizer comprising a liquid fertilizer added onto a dry carrier with the proviso that said dry carrier is not a fertilizer composition containing nitrogenous, phosphatic and potash fertilizers, with a seed to form a mixture and applying the mixture into the ground.

The dry fertilizer is safely and conveniently applied to young plants or seeds in a dry form. This dry form is generally a granular carrier and facilitates the application of said fertilizers in conjunction with other agrichemicals which are being applied concurrently. Furthermore, this fertilizer has unexpected release characteristics from the granule. The following are objects of the present invention:

1. The ease of delivery of alkanoic acids to plant production soils.
2. The elimination of negative effects of alkanoic acids or their salts and other fertilizer components on germination of plant development.
3. No negative effects of alkanoic acids and other fertilizer components on germination or plant development.

DETAILED DESCRIPTION OF THE PREFERRED EMBODIMENTS

The invention relates to a new dry fertilizer containing alkanoic acids or salts thereof. The alkanoic acids are preferably $C_1$ to about $C_6$ alkanoic acids and most preferably a $C_2$ alkanoic acid. The salts are preferably ammonia salts of an alkanoic acid. The alkanoic acids or salts thereof are sprayed on a dry carrier. The carrier can be, but is not limited to talc; clays such as, but not limited to silica;

Acrylamide—acrylic acid resin;
Acrylic acid—divinyl benzene copolymer;
Acrylic acid methyl ester, polymer with acrylonitrile;
Acrylic acid methyl ester, polymer with acrylonitrile and 1,3-butadiene
Acrylic acid polymer;
Acrylic acid polymer, sodium salt;
Acrylic acid, butyl ester, polymer with ethylene;
Acrylic acid, copolymer with butyl acrylate;
Acrylic acid, isopropanol telomer, ammonium salt;
Acrylic acid, polymer with ethyl acrylamide and diallyldimethylammonium chloride;
Acrylic acid, polymer with acrylamide, sodium salt;
Acrylic acid, polymer with ethyl acrylate and methylmethacrylate;
Acrylic acid, t-butyl ester, polymer with ethylene;
Acrylic acid-alpha-methylstyrene-styrene copolymer;
Acrylic acid-stearyl methacrylate copolymer;
Acrylonitrile-methyl methacrylate-vinylidene chloride copolymer;
Almond hulls;
Aluminum—magnesium silicate;
Aluminum hydroxide;
Aluminum hydroxide distearate;
Aluminum oxide;
Aluminum oxide silicate;
Aluminum silicate, hydrated;
Ammonium caseinate;
Ammonium sulfate;
Apple pomade;
Attapulgite;
Bentonite;
Bone meal;
bran;
Bread crumbs;
Calcium silicate;
Calcium silicate slag;
Canary seed;
Carbon;
Carbon black;
Carnauba wax;
Cellulose;
Cellulose acetate butyrate;
Cellulose carboxymethyl ether, sodium salt;
Cellulose, 2-hydroxypropyl ether;
Cellulose, carboxymethyl ether;
Cellulose, ethyl 2-hydroxyethyl ether;
Cellulose, ethyl ether;
Cellulose, omega-ether with ethoxylated 2-hydroxy-3-(trimethylammonio)propanol, chloride;
Cellulose, regenerated;
Ceresin wax;
Citric acid;
Citrus pulp, orange;
Clam shells;
Clay;
Coco shell flour;
Cocoa;
Coffee grounds;
Cork;
Corn;
Corn cobs;
Corn flour;
Corn meal;
Corn starch amylopectin;
Corn Syrup solids;
Cornstarch;
Cottonseed meal;
Cracked wheat;
Croscarmellose sodium;
Dextrin;
Dextrose;
Diatomaceous earth;
Dolomite;
Douglas fir bark;
Dried Blood
Egg shells;
Feldspar;
Ferric sulfate;
Fish meal;
Fuller's earth;
Galactin;
Gilsonite;
Graphite;
Ground or cracked oats;
Gar gum;
Gum Arabic;
Gum Ghatti;
Gum Tragacanth;
Gypsum;
Hectorite;
Hematite;
Hydrated amorphous silica;
Hydrolyzed caseins;
Hydrolyzed protein;
Hydroxylated lecithin;

Hydroxypropyl guar gum;
2-Hydroxypropyl methyl cellulose;
N-(2-Hydroxypropyl)decanamide;
Imidazolinidyl urea;
Invert sugar;
Iron ($Fe_3O_4$) and ($Fe_2O_3$);
Iron hydroxide oxide;
Iron magnesium oxide;
Iron oxide;
Iron, C3-13-carboxylate naphthenate complexes;
Kaolin;
Lactose, monohydrate;
Lauryl sulfate;
Lecithin;
Lecithins, soya;
Lignin solids;
Lignin sulphate;
Lime (chemical) dolomitic;
Limestone;
Locust bean gum;
Magnesium carbonate;
Magnesium hydroxide;
Magnesium oxide;
Magnesium silicate;
Magnesium silicate, hydrate;
Magnesium silicon oxide ($Mg_2Si_3O_8$);
Magnesium sulfate;
Malt extract;
Manganous carbonate (1:1);
Manganous oxide;
D-mannitol;
Meat meal;
Methyl cellulose;
Mica;
Milorganite;
Montmorillonite;
Mullite;
Nitrocellulose;
Oat meal;
Oat protein;
Oats;
Oyster shells;
Paraffin wax;
Paraffin wax, hydrotreated;
Paraffin waxes and hydrocarbon waxes, microcyst;
Paraffin waxes, clay treated;
Peanut meal;
Peanut shells;
Pecan shell flour;
Perlite;
Perlite, expanded;
Polyvinyl alcohol;
polyvinyl butyral resin;
polyvinyl butyrate;
polyvinyl chloride resin;
polyvinylpyrrolidone;
polyvinylpyrrolidone-vinyl acetate copolymer;
Potassium aluminum sulfate;
Potassium bisulfate;
Potassium chloride;
Potassium hydroxide;
Potassium nitrate;
Potassium phosphate (dibasic);
Potassium phosphate, monobasic;
Potassium silicate;
Potassium sorbate;
Potassium stearate;
Potassium sulfate;
Potatoes;
Pumice;
Pyrophyllite;
Quassia, extract;
Rice;
Rice bran;
Rice hulls;
Rye flour;
Saccharin;
Saccharin sodium;
Saccharin, sodium salt hydrate;
Saw dust;
Shale;
Silane, (chloropropyl)trimethoxy-;
Silane, dichlorodimethyl-, reaction products with silica;
Silane, triethoxyethyl-;
Silane, triethoxymethyl-;
Silane, triethoxypentyl-;
Silane and siloxanes, 3-cyanopropyl Methyl, di-Methyl, 3-hydroxypropyl Methyl, ethers with polyethylene-polypropylene glycol monoMethyl ether;
Silica Gel;
Silica gel,pptd., cryst.-free;
Silica, vitreous;
Silicon dioxide;
Silver oxide ($Ag_2O_2$);
Smectite-group minerals;
Sodium bisulfate;
Sodium bisulfite;
Sodium Chloride;
Sodium Potassium aluminum silicate;
Sodium silicate;
Sodium sulfate;
Soy flour;
Soybean hulls;
Soybean meal;
Starch, hydrogen phosphate, 2-hydroxypropylether;
Sucrose octaacetate;
Sugar;
Sulfur coated urea;
Sulphur;
Sunflower seeds;
Talc;
Tin oxide;
Tincalconite (B4Na2O7.5H2o);

Titanium dioxide;
Titanium sulfate;
Tobacco dust;
Tricalcium phosphate;
Trisodium phosphate;
Urea;
Urea, N,N"-methylenebis-;
Urea-formaldehyde resin;
Vermiculite;
Vinyl acetate, crotonic acid, vinylneodecanoate terpolymer;
Vinyl acetate, crotonic acid, vinylneodecanoate, glycidyl methacrylate polymer;
Vinyl acetate, polymer with methyl acrylate and methyl methacrylate;
Vinyl acetate, polymer with n-butyl acrylate;
Vinyl acetate-butyl acrylate-acrylic acid terpolymer;
Vinyl alcohol-vinyl acetate copolymer;
Vinyl chloride-vinyl acetate copolymer;
Vinyl chloride, polymer with butyl acrylate, N-methylolacrylamide, and acrylic acid;
Vinyl chloride, vinyl acetate and vinyl alcohol copolymer;
Vinyl chloride-isobutyl vinyl ether copolymer;
Vinyl pyrrolidone, polymer with trimethylolpropane trimethacrylate, hydroxypropyl methacrylate, and $C_{10}$–$C_{16}$-alkyl methacrylate;
Vinyl toluene;
N-vinyl-2-pyrrolidone;
Vinylbenzene—vegetable oil copolymer;
Vinylbenzyltrimethylammonium chloride, polymer with divinylbenzene;
Vinylbenzyltrimethylammonium hydroxide, polymer with divinylbenzene;
Vinylpyrrolidinone-styrene polymer;
Vinylpyrrolidone, copolymers with alpha-alkenes>C10;
Walnut shells;
Wheat;
Wheat flour;
Whey;
Wollastonite;
Xanthin gum
Yeast;
Zeolites, NaA;
Zinc (metallic);
Zinc Carbonate;
Zinc chloride;
Zinc hydroxide;
Zinc iron oxide;
Zinc oxide;
Zinc oxide sulfate ($Zn_4O_3(SO_4)$);
Zinc pyrophosphate;
Zinc sulfate, basic;
Zinc sulfate, monohydrate;
Zinc sulfide and
Zirconium oxide.

The dry carrier can be granular carrier having an average particle size greater than about 50 mesh or less than about 50 mesh.

The dry fertilizer is safely and conveniently applied to young plants or seeds in a dry form. This dry form is generally a granular carrier and facilitates the application of said fertilizers in conjunction with other agrichemicals which are being applied concurrently. The dry fertilizer can be added to other agrichemicals, such as but not limited to pesticides, herbicides etc., which are either in aqueous or dry form. It is preferable that the dry fertilizer be added to other agrichemicals in the dry form. The invention is preferably carried out without the use of a plaster material.

The invention further relates to a method of fertilizing a plant comprising applying a dry granular fertilizer comprising alkanoic acid or a salt thereof on a dry carrier into the ground in the vicinity of the plant's roots. It is also possible to mix the seed with the fertilizer and apply the mixture into the ground at the same time.

To make the dry fertilizer, first the liquid ingredients are mixed together, then the dry micronutrients are dissolved. The liquid mixture is sprayed onto a dry carrier. The dry carrier absorbs the liquid spray and this mixture becomes a dry fertilizer. The following examples further illustrate the invention.

The following are examples further illustrating the concept of the invention.

EXAMPLE 1

This test was designed to see if we could safen the application of a commercial fertilizer to seeds using the technology described above.

The fertilizer chosen for this test was BAYFOLAN®. BAYFOLAN® is manufactured by Helena Chemical Company and is designed primarily for folair application. The product contains 11% nitrogen, 8% phosphoric acid, and 5% potash. BAYFOLAN® is a registered trademark of Mobay Corporation.

A sample of BAYFOLAN® was taken from a commercially produced lot. 33.3% BAYFOLAN® was absorbed onto 66.7% HISEL ABS® is a registered trademark product from PPG Industries and is a silicon dioxide free-flowing powder (the carrier) which was then applied to corn seeds by placing the seeds and powder into a plastic bag for 5 hours. Concurrently, seeds were placed into a beaker containing liquid BAYFOLAN® for the same 5 hours.

At the end of 5 hours, the seeds were allowed to sit at room temperature for 1 hour, and then planted into a sandy soil mixture. The seeds were watered every other day using distilled water.

At the end of 4 days, the seeds treated with liquid BAYFOLAN® had not emerged from the soil. The seeds treated with the BAYFOLAN®/HISEL ABS® combination had emerged and grown to a height of about 3 inches.

This effectively demonstrates the safening effect that our technology offers to growers.

EXAMPLE 2

A blend of Helena Chemical Company's ASSET® and a commonly used fertilizer were applied to seeds using the technology described above. To further enhance plant growth, metal chelates are often added to fertilizers.

The fertilizer chosen for this example was 11-37-0, an ammonia polyphosphate solution. 11-37-0 is manufactured by several companies and is designed primarily for soil application. The product contains 11% nitrogen, 37% phosphoric acid, and no potash.

Helena's ASSET® contains the ammonia salt of alkanoic acids and is applied to soil with fertilizer.

The mixture of metal chelates contained Copper EDTA, Zinc EDTA, Manganese EDTA, and Iron HEDTA.

A sample of 11-37-0 was taken from a commercially produced lot, manufactured by Texasgulf, Inc. The ASSET® was taken from a commercially manufactured lot. The metal chelates were obtained from a commercially produced lot manufactured by Hampshire, Inc.

A solution was produced using a magnetic stirrer and a beaker containing 82.8% of 11-37-0 fertilizer, 14.9% ASSET®, and 2.3% of the metal chelate blend.

33.3% of the above fertilizer solution was then absorbed onto 66.7% HISEL ABS®, a silicon dioxide (silica) based carrier, available from PPG Industries. This produced a free-flowing powder which was then applied to corn seeds by placing the seeds and powder into a plastic bag for 5 hours. Concurrently, seeds were placed into a beaker containing liquid fertilizer solution for the same 5 hours.

At the end of 5 hours, the seeds were allowed to sit at room temperature for 1 hours, and then planted into a sandy soil mixture.

At the end of 4 days, the seeds treated with liquid fertilizer solution had not emerged from the soil. The seeds treated with the fertilizer solution/HISEL ABS® combination had emerged and grown to a height of about 2 inches.

This effectively demonstrates the safening effect that our technology offers to growers.

While there is shown and described herein certain specific structures embodying the invention, it will be manifest to those skilled in the art that various modifications and rearrangements of the parts maybe made without departing from the spirit and scope of the underlying inventive concept and that the same is not limited to the particular forms herein shown and described.

We claim:

1. A method of fertilizing a plant comprising applying a liquid comprising $C_1$ to about a $C_6$ alkanoic acid or a salt thereof onto a dry carrier to form a dry granule and placing said granule into the ground in the vicinity of the plant's roots, wherein said dry carrier is not a fertilizer composition containing nitrogenous, phosphatic and potash fertilizers.

2. The method as claimed in claim 1, wherein said alkanoic acid is $C_2$ alkanoic acid.

3. The method as claimed in claim 1, wherein said dry carrier is a granular carrier having an average particle size greater than about 50 mesh.

4. The method as claimed in claim 1, wherein said dry carrier is a carrier having an average particle size less than about 50 mesh.

5. The method as claimed in claim 1, wherein the alkanoic salt is an ammonia salt of an alkanoic acid and said dry carrier is a granular carrier of average particle size greater than about 50 mesh.

6. The method as claimed in claim 5, wherein said ammonia salt of an alkanoic acid is an ammonia salt of $C_2$-alkanoic acid.

7. The method as claimed in claim 1, wherein the alkanoic salt is an ammonia salt of an alkanoic acid and said dry carrier has average particle size less than about 50 mesh.

8. The method as claimed in claim 7, wherein the ammonia salt of an alkanoic acid is an ammonia salt of a $C_2$-alkanoic acid.

9. The method of fertilizing plants as claimed in claim 1, comprising adding an ammonia salt of a $C_1$ alkanoic acid onto a dry carrier and placing said carrier in the ground in the vicinity of the roots of the plants.

10. The method as claimed in claim 1, wherein said fertilizer contains no plaster or essentially no plaster.

11. The method as claimed in claim 1, wherein said fertilizer is immediately released.

12. A dry granular fertilizer consisting essentially of a liquid $C_1$ to about a $C_6$ alkanoic acid or a salt thereof added onto a dry carrier to form said dry granular fertilizer, wherein said dry carrier is not a fertilizer composition containing nitrogenous, phosphatic and potash fertilizers.

13. The fertilizer as claimed in claim 12, wherein said dry carrier is a granular carrier having an average particle size greater than about 50 mesh.

14. The fertilizer as claimed in claim 12, wherein said dry carrier has an average particle size less than about 50 mesh.

15. A plant production chemical mixture comprising the fertilizer as claimed in claim 12, mixed with as additional plant production chemical.

16. The plant production chemical mixture as claimed in claim 15, wherein said additional plant production chemical is a pesticide in a dry form.

17. The plant production chemical mixture as claimed in claim 15, wherein said additional plant production chemical is a fertilizer in a dry form.

18. A method of fertilizing a plant comprising applying the dry fertilizer as claimed in claim 12 onto the plant seeds.

19. The method as claimed in claim 18, wherein said alkanoic acid is $C_2$ alkanoic acid.

20. The method as claimed in claim 18, where said dry carrier is a granular carrier having an average particle size greater than about 50 mesh.

21. The method as claimed in claim 20, wherein said alkanoic acid salt is an ammonia salt of an alkanoic acid.

22. The method as claimed in claim 21, wherein said ammonia salt of an alkanoic acid is an ammonia salt of a $C_2$ alkanoic acid.

23. The method as claimed in claim 18, wherein said dry carrier is a carrier having an average particle size less than about 50 mesh.

24. The method as claimed in claim 23, wherein said alkanoic acid salt is an ammonia salt of an alkanoic acid.

25. The method as claimed in claim 24, wherein said ammonia salt of an alkanoic acid is an ammonia salt of a $C_2$ alkanoic acid.

26. The fertilizer as claimed in claim 12, wherein said alkanoic acid is acetic acid.

27. The fertilizer as claimed in claim 12, wherein said dry carrier is a fertilizer composition which does not contain nitrogenous, phosphatic and potash fertilizers.

28. A method to mix a seed with a fertilizer comprising mixing the seed with the fertilizer as claimed in claim 12.

29. A method of planting seed in the ground comprising mixing at the same time the dry fertilizer as claimed in claim 12, with a seed to form a mixture and applying the mixture into the ground.

30. The dry fertilizer as claimed in claim 12, wherein said fertilizer has sulfate anions which are not encapsulated.

31. The dry fertilizer as claimed in claim 12, wherein said fertilizer contains no plaster or essentially no plaster.

* * * * *